Aug. 5, 1930.  W. P. VAN LAMMEREN  1,772,119
HELICOPTER
Filed April 4, 1928   2 Sheets-Sheet 2
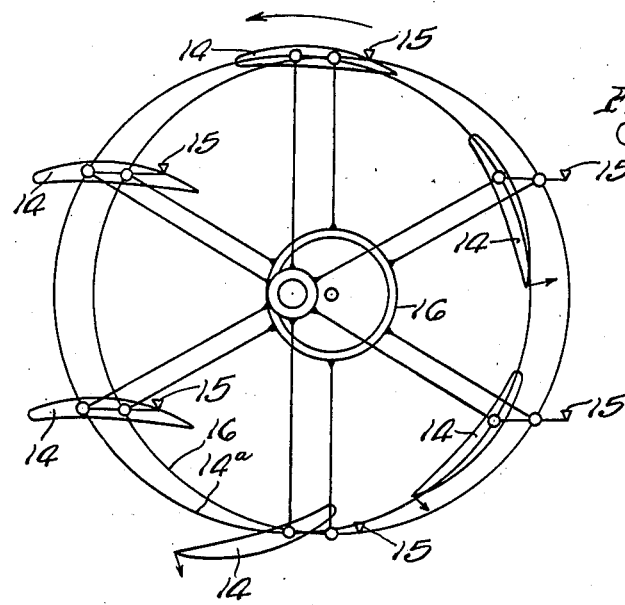
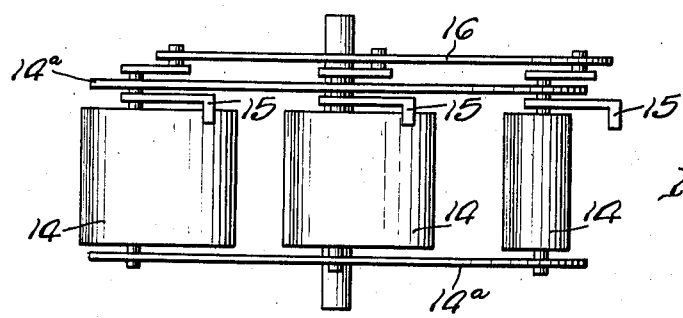
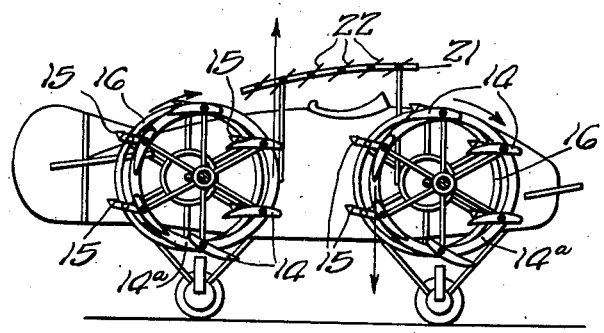
Inventor:
Willem P. van Lammeren,
By Chas. M. Nissen,
Atty.

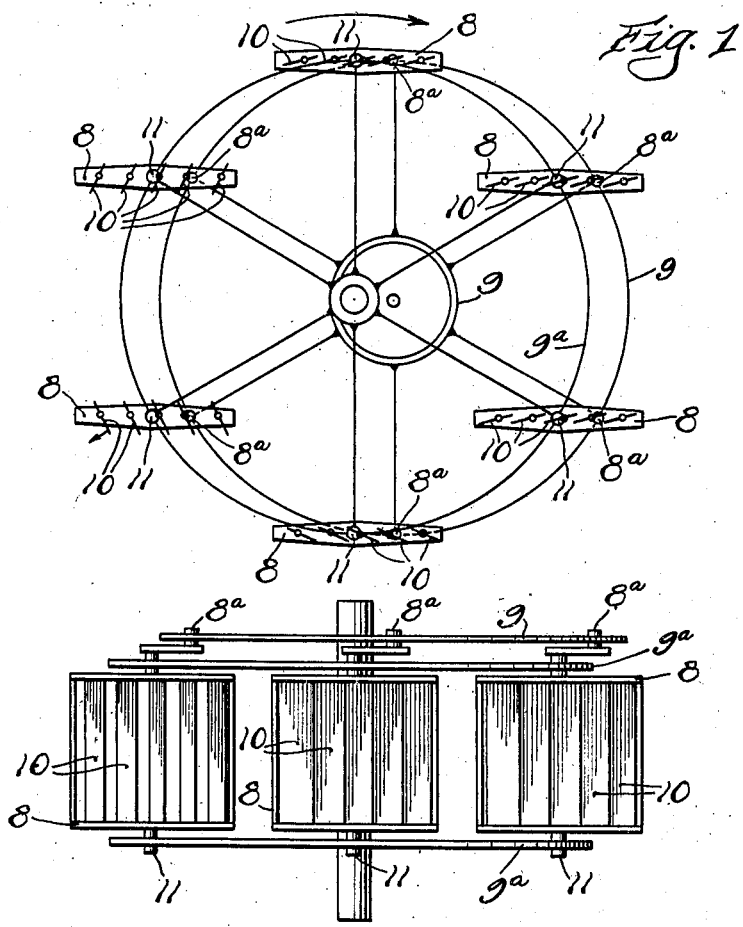

Patented Aug. 5, 1930

1,772,119

UNITED STATES PATENT OFFICE

WILLEM PETRUS van LAMMEREN, OF VOORSCHOTEN, NETHERLANDS

HELICOPTER

Application filed April 4, 1928. Serial No. 267,467.

This invention relates to rotary driving means for helicopters, and other machines adapted to be driven by air or other fluid, or to produce an air or other fluid flow.

According to the present invention, I provide rotary driving means, of the type stated, comprising a number of blades or equivalent rotatable about a common axis, and automatically adjustable during rotation, so that the reaction between the air or other fluid and the rotating blades or equivalent is effective for driving purposes in a single direction. Preferably, the blades or equivalent are automatically adjustable during rotation so as to vary the area or projected area of each blade or equivalent in a plane normal to its direction of rotation.

Means may be provided for changing the direction in which the blades or equivalent are effective for driving purposes, as, for example, in the case of a helicopter, which may first be made to rise vertically and thereafter fly horizontally. The blades or equivalent, while driving, are preferably maintained parallel to themselves by eccentric or other means, in which case, the eccentric or other means may be angularly adjustable about the common axis of the blades or equivalent.

The blades may comprise a number of wings or slats each of which is mounted on a pivot removed a short distance from its true longitudinal axis, which pivot is substantially parallel to the common axis about which the wings or slats rotate, the said wings or slats, when in operative position, being supported by stop means, and being self-adjustable under the action of the air or other fluid into and out of the said operative position for driving purposes. The said slats may be arranged in sets and be supported by carriers arranged at equal intervals round the rim of a blade wheel, or instead of the said sets and carriers, I may use single pendulous wings.

For use in helicopters, I may use rotary driving means as above specified in combination with shutter means provided in the wing or wings of the helicopter, the said shutter means being adapted to close and open respectively when the helicopter rises and falls, and thereby impart buoyancy to the helicopter to assist in keeping the latter stationary after it has risen and to assist in effecting gradual descent.

Different embodiments of the invention will now be described, by way of example, with reference to the annexed drawings, in which:—

Figs. 1 and 2 are side and plan views respectively of an embodiment comprising blades each of which is made of a series of unsymmetrically pivoted slats;

Fig. 3 is a diagrammatic view in side elevation of a helicopter embodying my invention.

Figs. 4 and 5 are side and plan views respectively of an embodiment comprising blades each of which consists of a single unsymmetrically pivoted wing.

Referring to Figs. 1 and 2:—

The blade wheel $9^a$ and eccentric wheel 9 are aranged as shown in Fig. 1. At equal intervals on the rim of the wheel $9^a$, carriers 8 are turnably mounted on the pins 11 so that they can maintain the same inclination relatively to the ground, as determined by guide pins $8^a$ rotatably connected to the rim of the eccentric wheel 3, the function of the pins $8^a$ and 11 being to maintain the carriers 8 at the desired angle. By rotating the wheels 9 and $9^a$ relatively to each other, the inclination of carriers 8 may be varied to change the direction of flight.

Between each pair of side members comprising the carriers 8, a number of slats 10 are pivotally mounted. As will be seen from Fig. 1, the pivotal mounting of each slat 10 is arranged unsymmetrically relative to the breadth of the slat, so that, when the blade wheel $9^a$ is stationary, the slats 10 normally lie vertical due to the larger and heavier part of each slat swinging below the pivotal mounting. On rotation of the blade wheel $9^a$ by the power means of the machine, the resulting air resistance automatically causes the slats 10 to take up the positions shown in Fig. 1. That is to say, the ascending slats, and the slats at the top and bottom of the wheel 9ª, lie so that their individual axes are substantially parallel to the instantaneous line of motion of the respective carrier 8, while, in respect of the descending slats, the individual axes thereof and the line of motion of the respective carrier 8 are substantially at right angles. In the case of the ascending slats 10, the unsymmetrical mounting of the said slats and the excess of pressure on the bottom of the slats acts in opposition to the natural tendency of the said slats to lie vertical.

Wheels 9 and 9ª are rotated at equal speeds so that the line between pins 8 and 11 always remains at the same inclination unless the angle is changed by rotating the wheels relatively to each other as previously described. As will be understood, the axis of the eccentric wheel 9 can be angularly adjusted relatively to the axis of the blade wheel 9ª when horizontal or other movement is desired.

Referring to Figs. 4 and 5:—

The construction shown in these figures may be compared with the construction shown in Figs. 1 and 2, from which it differs in so far as a single pendulous wing 14 takes the place of each series of unsymmetrically pivoted slats. In addition, the pendulous wings 14 are each associated with a stop 15 (see Fig. 5) the said stop being pivotally connected to the rim of both the blade wheel 14ª and the eccentric wheel 16 so that each such stop 15 as it travels round the axis of the blade wheel remains at a constant inclination relatively to the body of the machine. As will be seen from Fig. 4, an excess of pressure on the underside of the descending wings 14 causes such wings to be pressed upwards against the said stops 15, whereas the excess pressure on the upper side of the ascending wings 14 in addition to the weight of the said wings themselves, causes the ascending wings to hang substantially in the instantaneous line of motion, i. e. substantially tangential to the blade wheel 14ª.

As in the previously described construction, the eccentric wheel 16 can be adjusted so that when the machine has risen vertically in the manner of a helicopter, flying can be effected in a horizontal direction.

Referring, lastly, to Fig. 3:—

The helicopter, shown diagrammatically, has two blade wheels 14ª and 16 corresponding to the similar parts in Figs. 4 and 5. The wing 21 of the helicopter has pendulous slats 22 mounted in openings made in the wing for that purpose, the said slats automatically uncovering the said openings when the helicopter is driven upwards, and, on the other hand, closing firmly when upward movement ceases, for the purpose of imparting buoyancy to the helicopter when stationary, or when it is desired that the descent should be gradual.

It will be understood that in the invention as described various modifications may be made without departing from the scope of the appended claims. For example, instead of using a rotating eccentric wheel, I may use a relatively fixed eccentric guide, in an eccentric groove of which a crank pin on each blade or wing may engage. Moreover, the hemispherical shells herein described may be reversed by spring stops or cam means instead of the fixed stops illustrated.

It is also to be understood that the herein described machines may be fitted, if necessary or desirable, with ordinary rudders and/or propellers. Likewise, it will be appreciated that the rotary driving devices above described are also applicable for use in windmills, the axis of the blade wheels and eccentric wheels being in this case set vertically and being adjustable to suit different directions of the wind. The said devices may also be used in connection with air fans or blowers.

I claim:—

1. Rotary fluid reactive driving means comprising in combination a blade wheel, an eccentric wheel, a plurality of spaced blades carried by said blade wheel, each of said blades being pivoted at one side of its center of gravity, stops on said eccentric wheel co-operating with said blades to maintain certain of said blades in operative position against the fluid pressure and to permit other of said blades to assume an inoperative position of minimum resistance to the fluid pressure.

2. Rotary fluid reactive driving means comprising a plurality of driving blades pivotally mounted on a rotary supporting frame at spaced intervals substantially equidistant from the axis of rotation of said frame, said blades being eccentrically pivoted with respect to their centers of gravity and free to rotate about the pivotal centers under the force of the fluid reacting against the blades as said frame rotates, stops for limiting the movement of said blades in one direction so as to bring said blades into a substantially fixed position as said blades rotate against said stops, and means for constraining said stops to move in substantially fixed relation to a horizontal plane through the pivots of said blades, said stops being so arranged as to cause the blades to occupy a position at substantially right angles to the direction in which it is desired to cause bodily movement of said frame.

3. Rotary fluid reactive driving means comprising a frame mounted to rotate about an axis, a second frame mounted to rotate about an axis parallel to said first axis, arms connecting said frames together at spaced points about their centers, stops on said arms, and blades eccentrically pivoted with respect to their centers of gravity and pivoted at points removed from said stops, said blades being adapted to abut against said stops when forced in a direction toward said stops by the fluid in which said driving means rotates, said blades when against said stops, occupying positions at substantially right angles to the direction in which said reactive driving means is adapted to move, while said blades are permitted to follow the line of least resistance when said blades are being moved in said last-mentioned direction.

4. Rotary fluid reactive driving means comprising a frame mounted to rotate about an axis, a second frame mounted to rotate about an axis parallel to said first axis, arms connecting said frames together at spaced points about their centers, stops on said arms, and blades eccentrically pivoted with respect to their centers of gravity and pivoted at points removed from said stops, said blades being adapted to abut against said stops when forced in a direction toward said stops by the fluid in which said driving means rotates, said blades, when against said stops, occupying positions at substantially right angles to the direction in which said reactive driving means is adapted to move, while said blades are permitted to follow the line of least resistance when said blades are being moved in said last-mentioned direction, said frames being adjustable to vary the relation between their axes to thereby vary the relation between said stops and blades for varying in turn the direction in which said blades tend to move said reactive elements.

In testimony whereof I have signed my name to this specification on this 26th day of March, A. D. 1928.

WILLEM PETRUS van LAMMEREN.